US007794160B1

(12) United States Patent
Arthur

(10) Patent No.: US 7,794,160 B1
(45) Date of Patent: Sep. 14, 2010

(54) SUPPORT SYSTEM FOR A CAMERA STABILIZING DEVICE

(76) Inventor: Janice Arthur, 1801 S. Michigan Ave., Chicago, IL (US) 60616

( * ) Notice: Subject to any disclaimer, the term of this patent is extended or adjusted under 35 U.S.C. 154(b) by 165 days.

(21) Appl. No.: 12/273,303

(22) Filed: Nov. 18, 2008

(51) Int. Cl.
*G03B 17/00* (2006.01)

(52) U.S. Cl. ...................................... 396/421; 396/423

(58) Field of Classification Search ......... 396/420–423, 396/425; 352/243
See application file for complete search history.

(56) References Cited

U.S. PATENT DOCUMENTS

| 4,037,763 | A | * | 7/1977 | Turchen ..................... 224/153 |
| 4,158,490 | A | | 6/1979 | Gottschalk et al. |
| 4,976,387 | A | | 12/1990 | Spianti |
| 5,174,590 | A | | 12/1992 | Kerley |
| 5,360,196 | A | | 11/1994 | DiGiulio et al. |
| 6,170,840 | B1 | | 1/2001 | Mathias |
| 6,439,515 | B1 | | 8/2002 | Powers |
| 7,140,622 | B1 | | 11/2006 | Cantu |
| 2007/0205241 | A1 | | 9/2007 | Mourao |

* cited by examiner

*Primary Examiner*—W. B. Perkey
(74) *Attorney, Agent, or Firm*—Adam K Sacharoff; Much Shelist

(57) ABSTRACT

A support system is provided for a user operating a camera attached to a stabilizing device. The support system includes a waist belt adapted to secure around a waist of the user. A mounting bracket is secured to the front section of the waist belt and is attached to a socket block. A first brace support bar is positioned substantially along a horizontal plane through a bore in the mounting bracket. The first brace support bar has opposed ends separately secured to a first pair of end brackets. A pair of second brace support bars separately extend downwardly from the first pair of end brackets. A lower end defined in the second brace support bars are then secured to one of a second pair of end brackets. Lastly, a pair of forks are separately secured to the second pair of end brackets, each fork receiving a wheel.

19 Claims, 10 Drawing Sheets

SUPPORT SYSTEM FOR A CAMERA STABILIZING DEVICE

FIELD OF THE INVENTION

The present invention relates to a support system for portable equipment utilized in conjunction with motion picture film camera or video cameras.

BACKGROUND OF THE INVENTION

In employing motion picture film cameras or video cameras to capture images, it is extremely important to maintain the camera in a stable position in order to obtain a high quality result. This also helps to eliminate the effects of undesirable camera motion appearing in the images. In order to overcome these problems, and to reduce the expense encountered in producing motion picture films and video productions, the "Steadicam®" portable camera stabilizing device was developed. Using this device, which has become a de-facto standard in the industry, high quality results have been obtainable in a variety of circumstances. This is so even when the camera operator walks or runs with the camera because of the attendant increase in stability, particularly in stabilizing quick angular deviations along the axes of pan, tilt and roll, which previously could not be adequately controlled.

The Steadicam® camera stabilizing device is subject to its own patents and thus not discussed or detailed in the present invention. A key component of the Steadicam® camera stabilizing device is its substantially friction-free arm sections which are rotatably and pivotally interconnected at a hinge bracket or socket block. Each arm section is formed as a parallelogram, and is provided with segmented springs which are designed to apply a constant force to compensate for the weight applied to the end of the support arm. As a result of this, the weight carried by the support arm is spatially decoupled from the camera operator to increase isolation of the weight from the operator as well as the camera support itself.

A principal design feature of the support arm, which is critical to proper functioning of the Steadicam® camera stabilizing device, is the ability of the support arm to support the fixed weight of the overall system from its lowest to its highest point of articulation with a relatively constant amount of positive "buoyancy".

The art of using the Steadicam® camera stabilizing device has maintained itself to the mounting of the Steadicam® camera stabilizing device to the hinge bracket which is secured to or supported by a harness worn around the shoulders of a camera operator, see U.S. Pat. Nos. 4,976,387, 5,360,196 and 4,158,490 for a typical background of how a user supports the Steadicam® camera stabilizing device. However, because of the weight of the camera and the Steadicam® camera stabilizing device a lot of weight is still placed on the shoulders, back and legs of the camera operator. The only recent exception to the harness was the mounting of a camera to a SEGWAY® as shown and described in US Patent Application publication 2007/0205241. However, the modification of a SEGWAY® requires an expensive addition to the cost of the operation of a camera.

A need therefore exists in the art to help reduce the weight placed on a camera operator while keeping the cost of the support system relatively inexpensive. The present invention was designed to meet one or more of these needs.

SUMMARY OF THE INVENTION

In accordance with the present invention there are provided various embodiments of a support system for a user operating a camera attached to a camera stabilizing device including a socket block used for connecting to the camera stabilizing device. In one of the embodiments the support system would include a waist belt adapted to secure around a waist of the user operating the camera. A mounting bracket, secured to the front section of the waist belt, has a means for attaching to the socket block. A first brace support bar is positioned substantially along a horizontal plane and secured through a bore defined through the mounting bracket. The first brace support bar has opposed ends separately secured to a first pair of end brackets. A pair of second brace support bars separately extend substantially downwardly from the first pair of end brackets. A lower end defined in the second brace support bars are then secured to one of a second pair of end brackets that would be opposed from the first pair of end brackets. Lastly, a pair of forks are separately secured to the second pair of end brackets, each fork receives a wheel such that a pair of wheels, defined by each wheel received by the pair of forks, rotate independently of each other without sharing a common axis.

In other aspects of the embodiment, the waist belt is adjustable. In addition, the waist belt may further include a padded section attached to an inside portion of the front section of the waist belt such that the padded section is positioned between the waist belt and the user operating a camera.

In another aspect of the embodiment, the mounting bracket is secured to the socket block by providing a mounting bracket with at least one opening that aligns with a corresponding opening on the socket block, and providing at least one bolt secured through the aligned openings on the mounting bracket and socket block.

In yet another aspect of the embodiment, the first brace support bar is laterally adjustable in the bore of the mounting bracket by having a plurality of lateral openings on the first brace support bar that align with at least one opening on the mounting bracket, and at least one removable pin placed through the at least one opening on the mounting bracket and an aligned opening on the first brace support bar.

In yet other aspects of the embodiment, the second pair of end brackets each include a first opening positioned in a substantially upright position for receiving the lower end of one of pair of second brace support bars and include a second opening positioned at an angle defined as about 90° from the first opening for receiving an end of the fork. The angle may also be defined between 90° and 180° from the first opening for receiving an end of the fork.

In other aspects of the embodiment, each of the pair of second brace support bars includes an adjustable two piece support bar and/or the pair of second brace support bars being spaced about 25-30 inches apart.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1A:
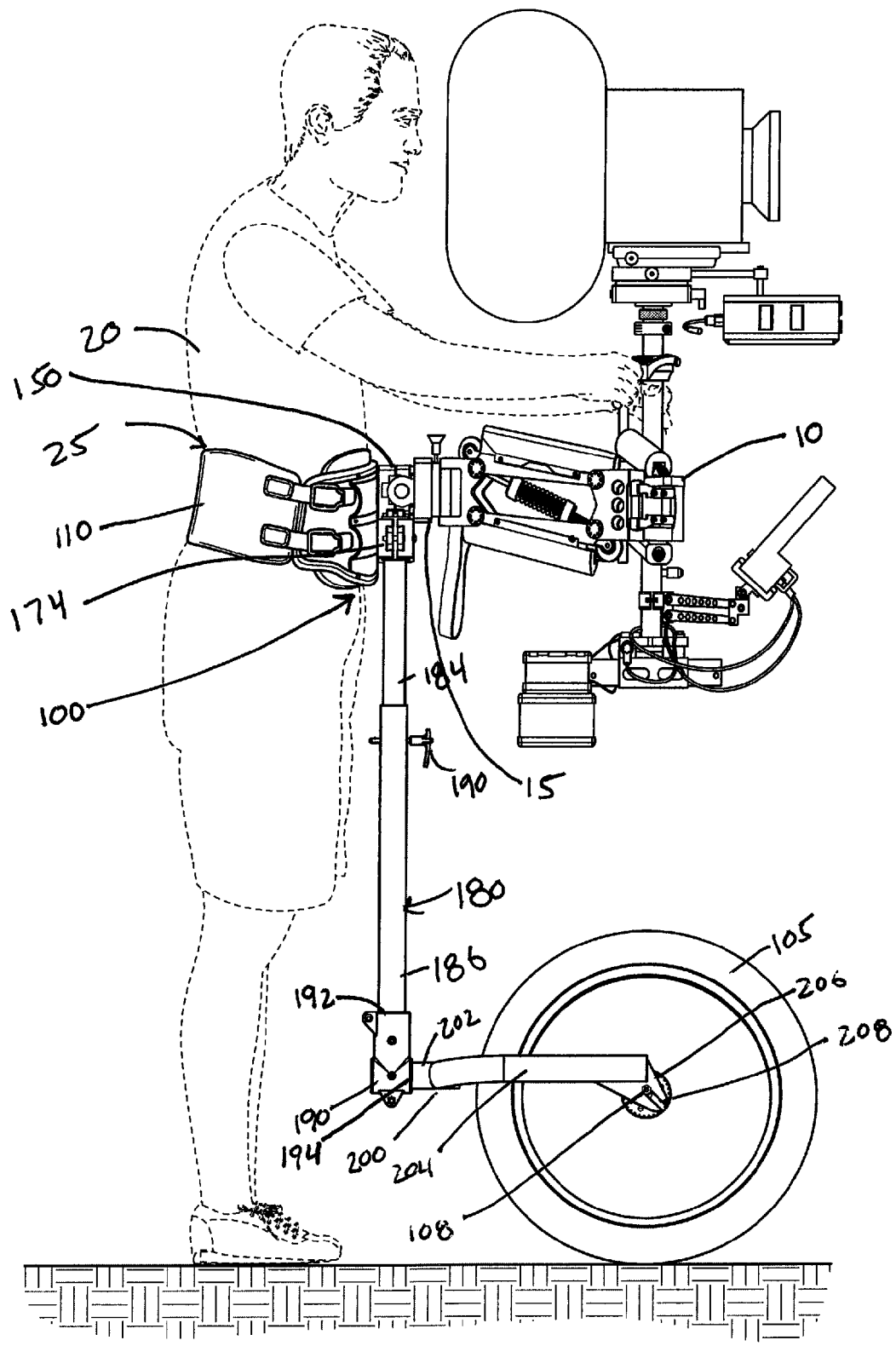
FIG. 1A is a side view of a first embodiment of a support system defined in accordance with the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 1B:
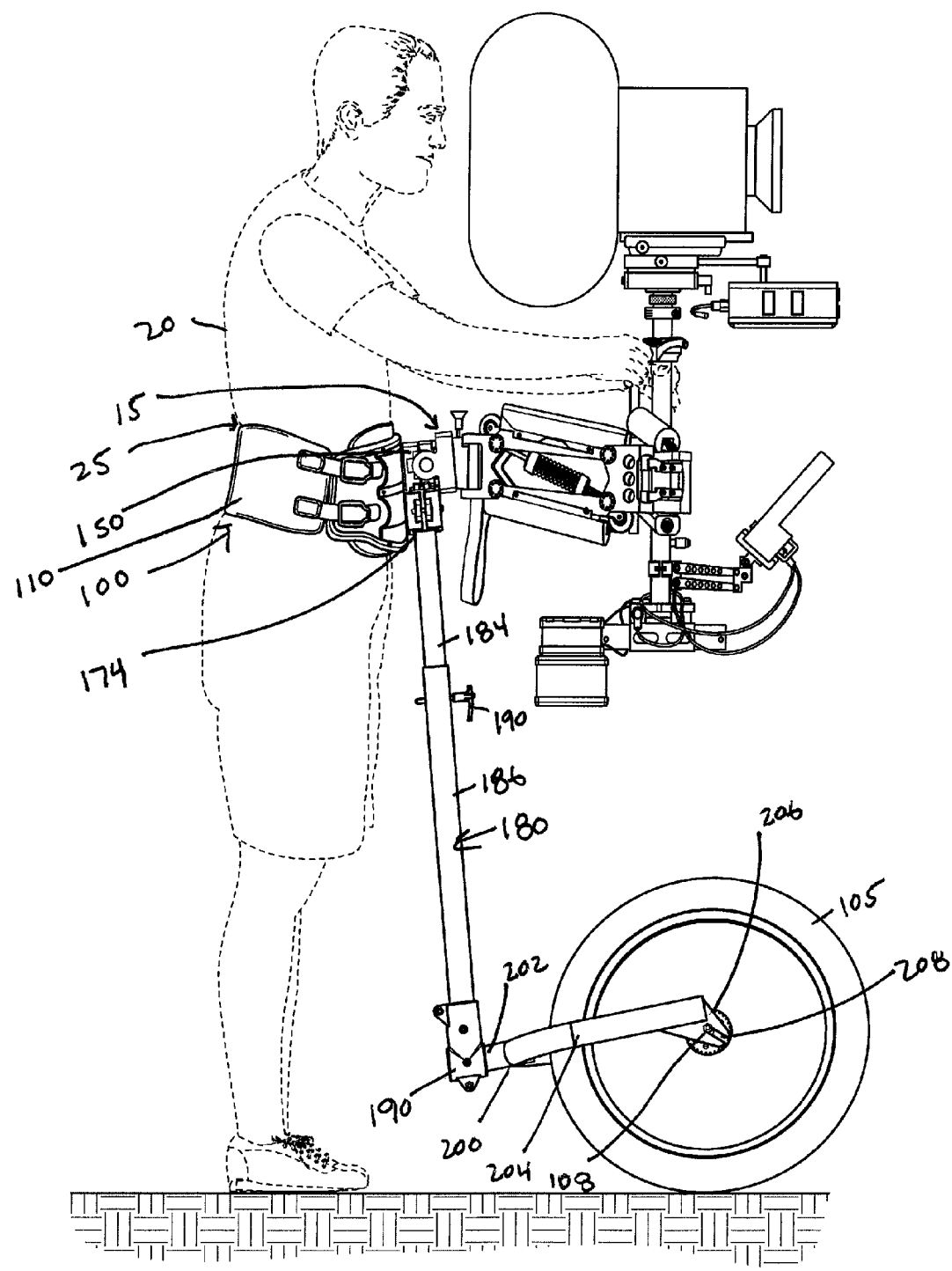
FIG. 1B is a side view of the first embodiment illustrating the support system angled slightly away from the user.
Figure 2:
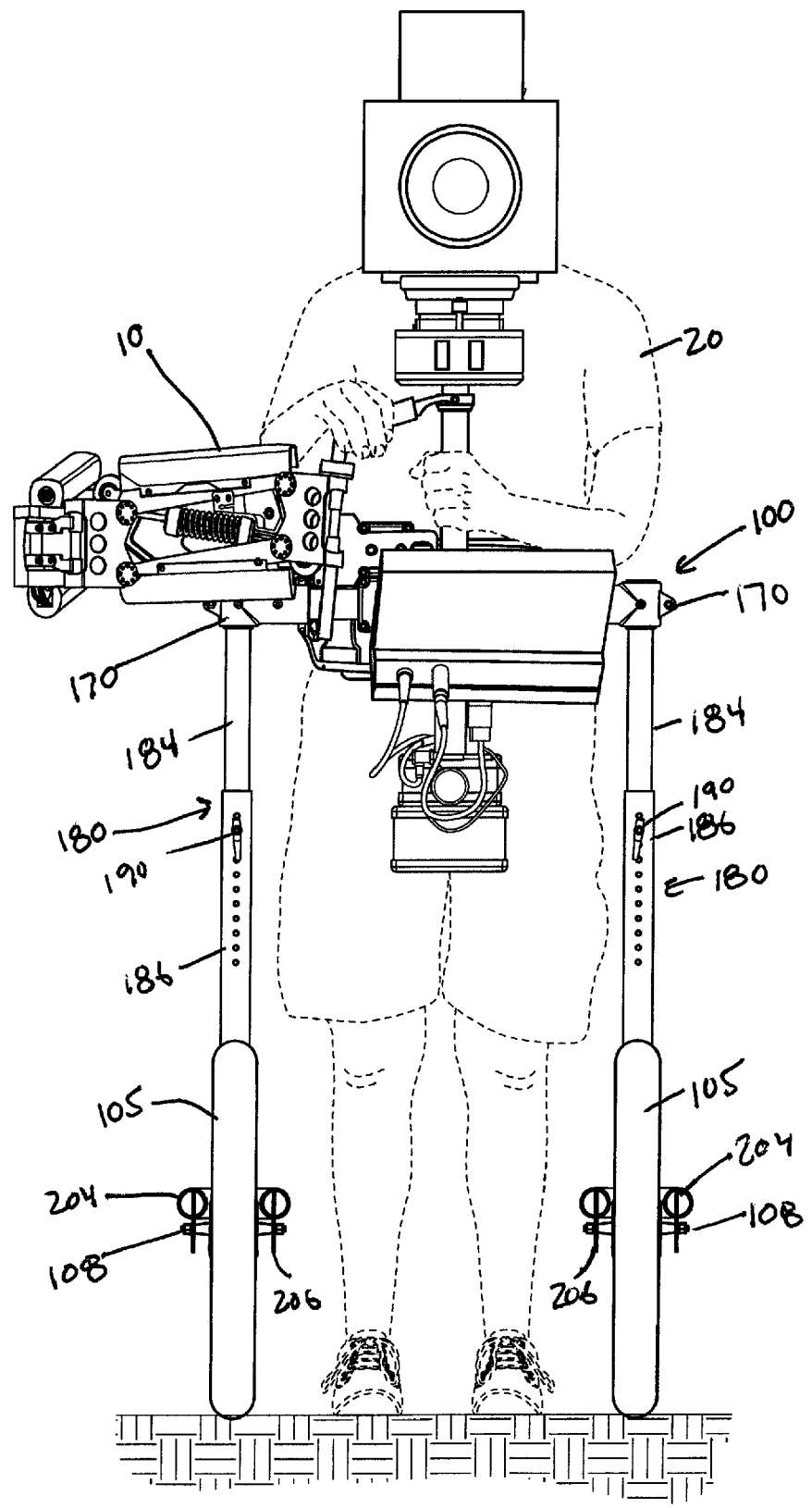
FIG. 2 is a front view of FIG. 1A.

Referring now to FIGS. 1a-2 there is shown a first embodiment of the present invention in providing a support system 100 for a camera stabilizing device 10. As mentioned in the background of this invention, the camera stabilizing device 10 is secured to a hinge bracket, often referred to as a socket block 15. A camera operator 20 is shown operating the camera and positioned wearing the support system 100.

As distinguished from the prior art, the support system 100 of the present embodiment does not require a shoulder harness but rather helps reduce and keep the weight of the camera stabilizing device and camera off or away from the camera operator. The weight of the camera stabilizing device and camera would be positioned onto a pair of independently rotating wheels 105.

Figure 3:
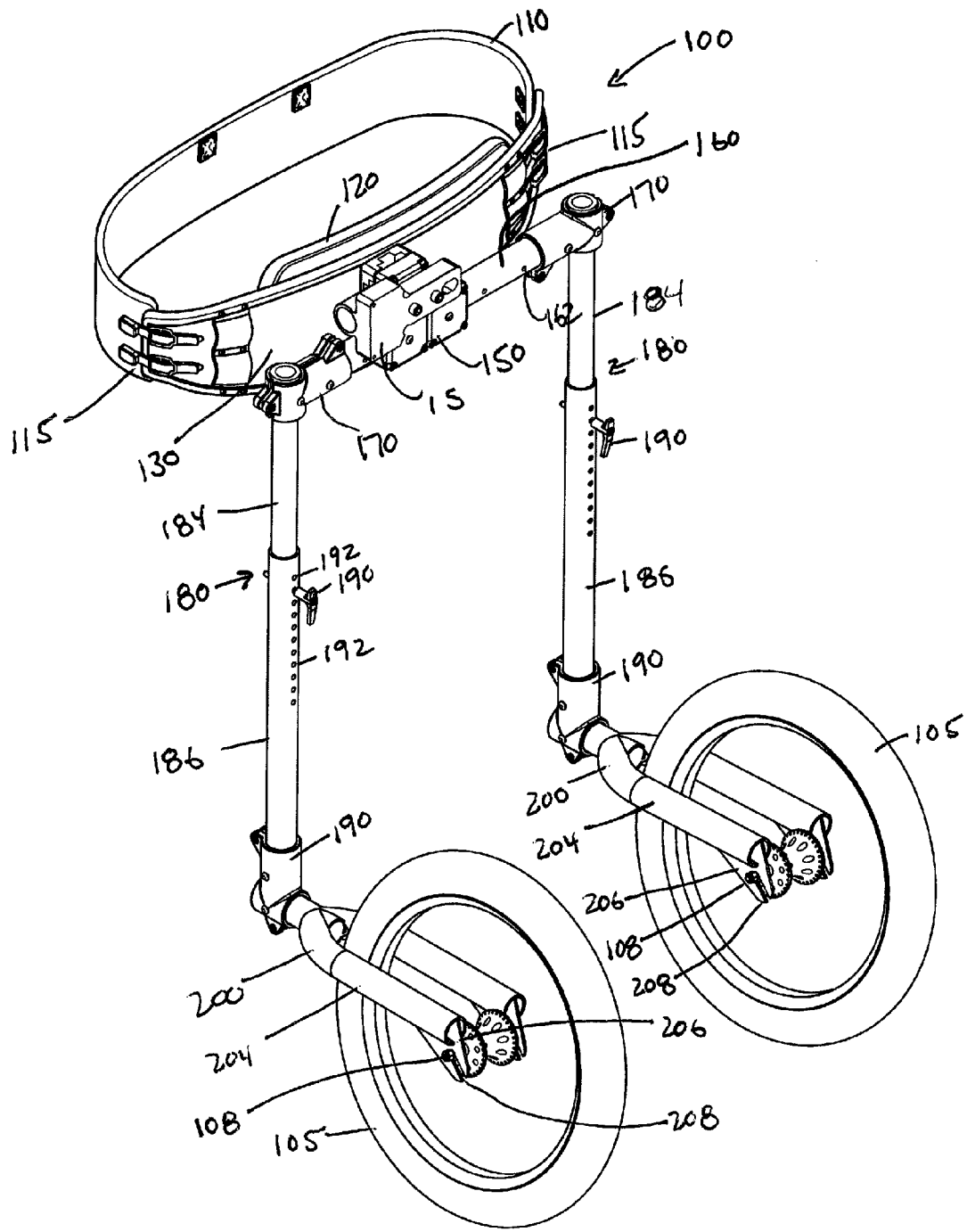
FIG. 3 is a perspective view of the support system from FIG. 1A.
Figure 4:
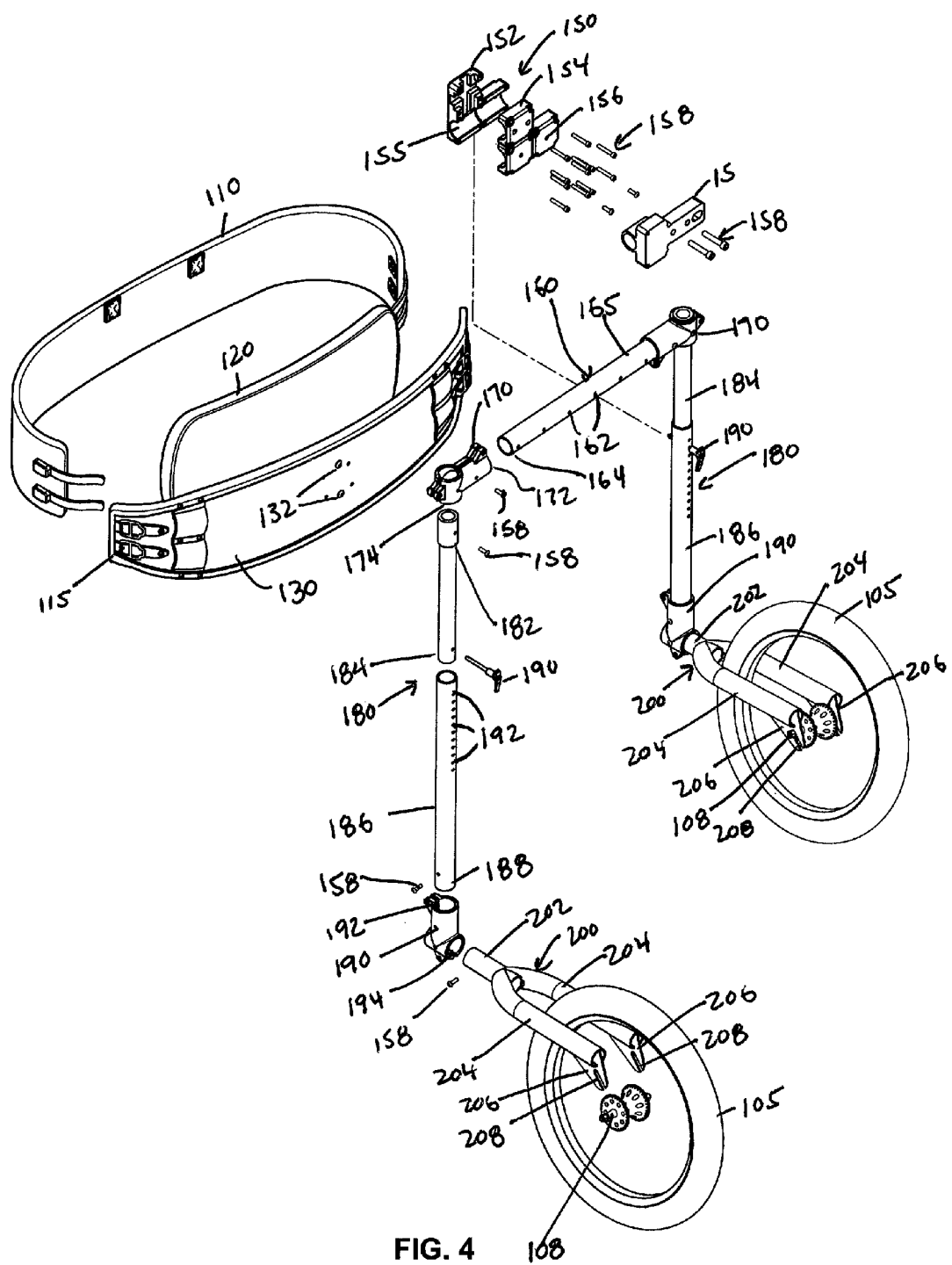
FIG. 4 is a partial exploded view of the support system from FIG. 3.

Also referring now to FIGS. 3 and 4, the support system 100 will be described in greater detail and in reference to individual elements. The support system 100 includes a waist belt 110 that secures around a middle section or waist 25 of the camera operator 20. Clips or other types of adjustable securing means 115 are placed on one or more sides of the belt 110 to accommodate different operator sizes. The belt 110 also includes a padded section 120 that is positioned between the camera operator 20 and an inside portion 125 of the front section 130 of the belt 110.

The socket block 15 which attaches to the camera stabilizing device is secured to the front section 130 of the belt 110. This may be accomplished by attaching the socket block to a mounting bracket 150 that is also secured to the front section 130 of the belt 110. Bolts or pins 158 may be used to attach the socket block 15 to the mounting bracket 150. And then additional bolts or pins may be used to secure the mounting bracket 150 to the front section 130 of the belt 110.

The mounting bracket 150 is also secured around a first brace support bar 160. The mounting bracket 150 would include a two piece housing 152 and 154 that has an internal profile 155 corresponding to the outside profile 165 of the first brace support bar. Openings 156 through the mounting bracket 150 would align with openings 164 in the first brace support bar 160 such that the bolts 158 could pass through the mounting bracket 150 and first brace support bar 160 and then pass through openings 132 in the front section 130 of the belt 110. Additional openings 162 may be provided on the first brace support bar 160 to allow the mounting bracket 150 to be laterally adjusted to the camera operators preferences.

Secured to the ends 164 of the first brace support bar 160 are a first set of L shaped bracket ends 170. Each of the first set of L shaped bracket ends have two openings 172 and 174 angled about 90 degrees from each other. One of the openings 172 receives one of the ends 164 from the first brace support bar 160 while the other opening 174 receives a top end 182 from a second brace support bar 180. The first set of L shaped bracket ends further include bolt or pin openings that help secure the ends of the bars 160 and 180 to the bracket end 170.

The first brace support bar 160 is preferably oriented in a substantially horizontal position about the midsection of the camera operator, while the second brace support bar 180 is oriented in a substantially vertically position. Shown in FIGS. 1A and 1B, the angle between the two bars 160 and 180 may be adjusted depending upon the camera operators preferences.

The second brace support bars 180 being positioned at both ends of the first brace support bar 160 may also be adjustable by having a two piece support bar 184 and 186 that are secured to one another by a pin 190 that is inserted through aligned pin openings 192 on the two piece support bars 184 and 186.

The bottom end 188 of the second brace support bars 180 are secured to a second set of L shaped bracket ends 190. Similar to above, the second set of L shaped bracket ends 190 have a pair of openings 192 and 194 angled about 90 degrees from each other to permit the second brace support bars 180 to attach to a fork 200. The second set of L shaped bracket ends further include bolt or pin openings that help secure the ends of the bar 180 and fork 200 with the bracket ends 190.

Each fork 200 consists of a first end 202 that splits into a pair of spaced members 204. The first end 202 of the fork 200 is secured to the opening 194 defined in the second set of L shaped bracket ends 190. At the end of the spaced members 204 are fork stays or plates 206. Each of the fork plates 206 includes a slot 208, which receives a wheel axle 108. The wheel axle 108 being further secured through the wheel 105.

Figure 5:
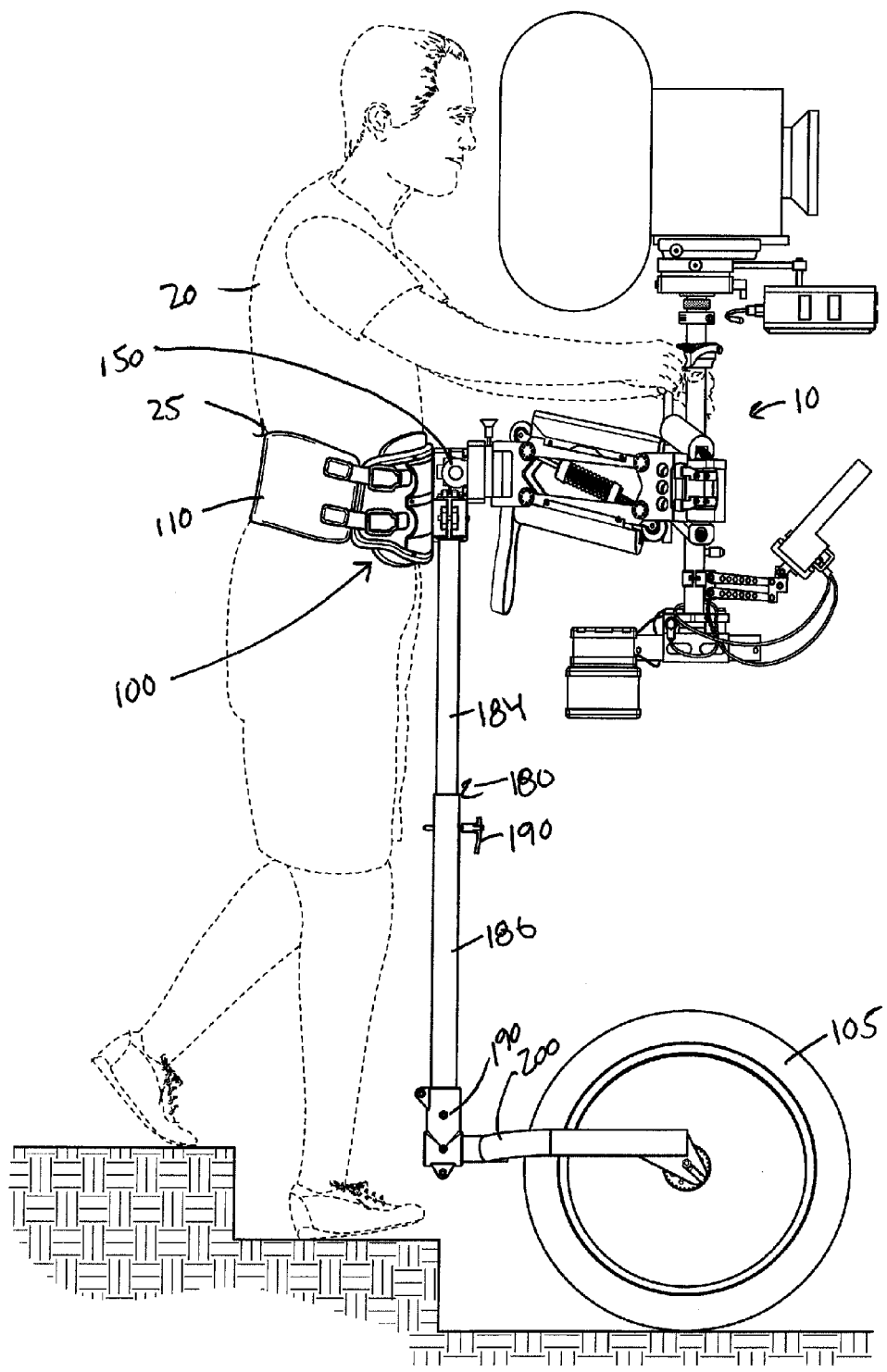
FIG. 5 is a side view of the support system from FIG. 1A illustrating the use of the support system down stairs.

Since the pair of wheels 105 are spaced about by the length of the first brace support bar 160 and are separately rotating, meaning the two wheels are not attached by a common axle, a camera operator is capable of walking without having to worry about kicking or tripping over an axle connecting the two wheels. The support system 100 can also be used to walk down stairs or curbs (illustrated in FIG. 5) without having to worry about both wheels being on a leveled or same plane. In fact, it is possible to adjust the second brace support bars 180 such that one of the support bars is extended lower than the other. This would allow one wheel to ride on a curb and the other to ride on the street, below the curb, while the operator pushed the support system 100 along.

In addition, the first brace support bar 160 may have a length of about 25-30 inches wide to permit the support system 100 to fit through doorways.

Figure 6:
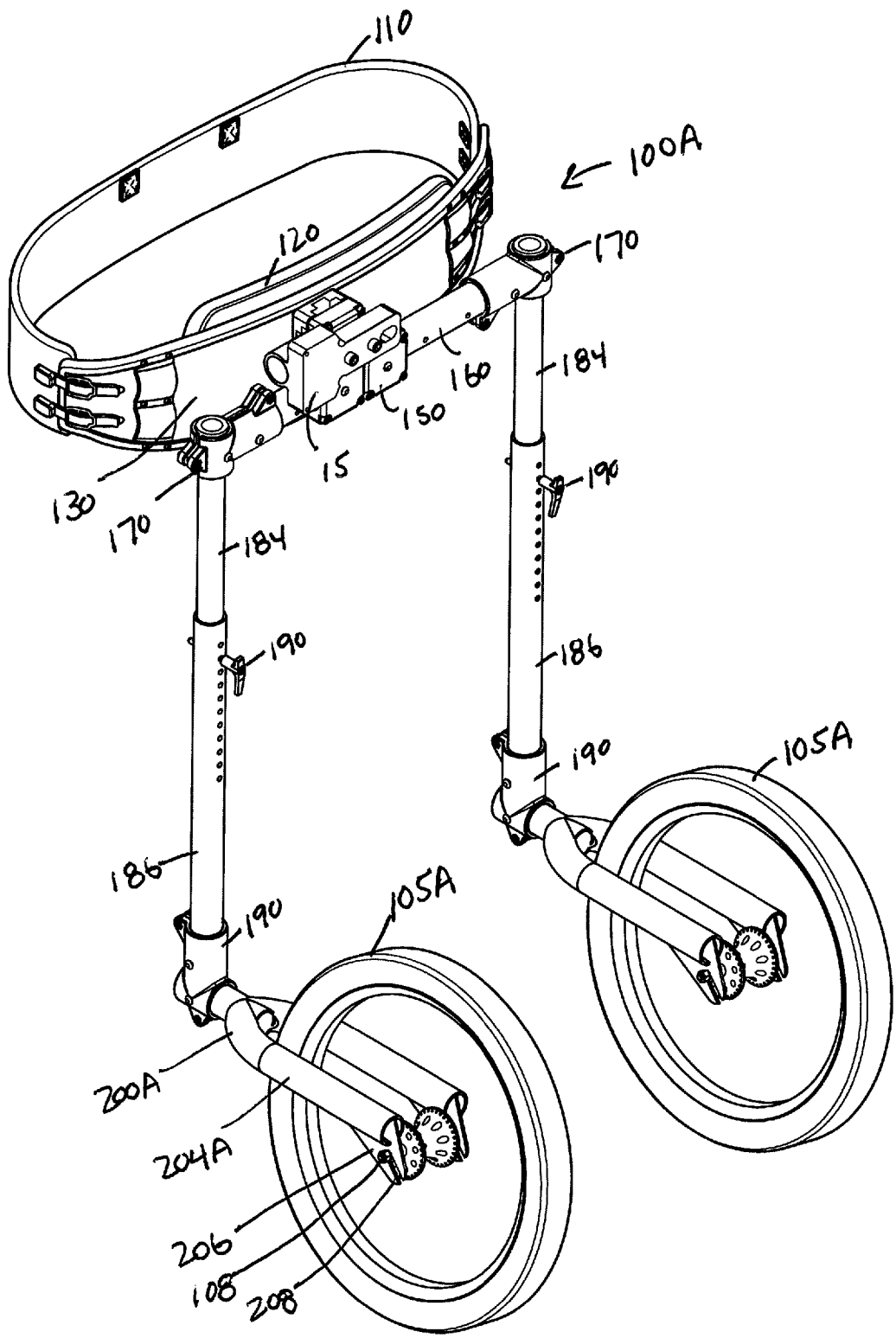
FIG. 6 is a second embodiment of a support system illustrating wider wheels.

In a second embodiment of the present invention, a second support system 100A shown in FIG. 6 includes a wider wheel 105A. The wider wheel may help in balancing or turning the support system 100A or can be used for sand or granular terrain. To accommodate the wider wheel 105A a secondary fork 200A would be provided with a wider space between the pair of spaced members 204A. As used in the present invention the term wider wheel refers to a wheel that has a larger width than a typical bicycle wheel width of about 1.25, 1.375, or 1.75 inches, i.e. greater than 1.75 inches and could even be as large as 5-6 inches wide.

Figure 7:
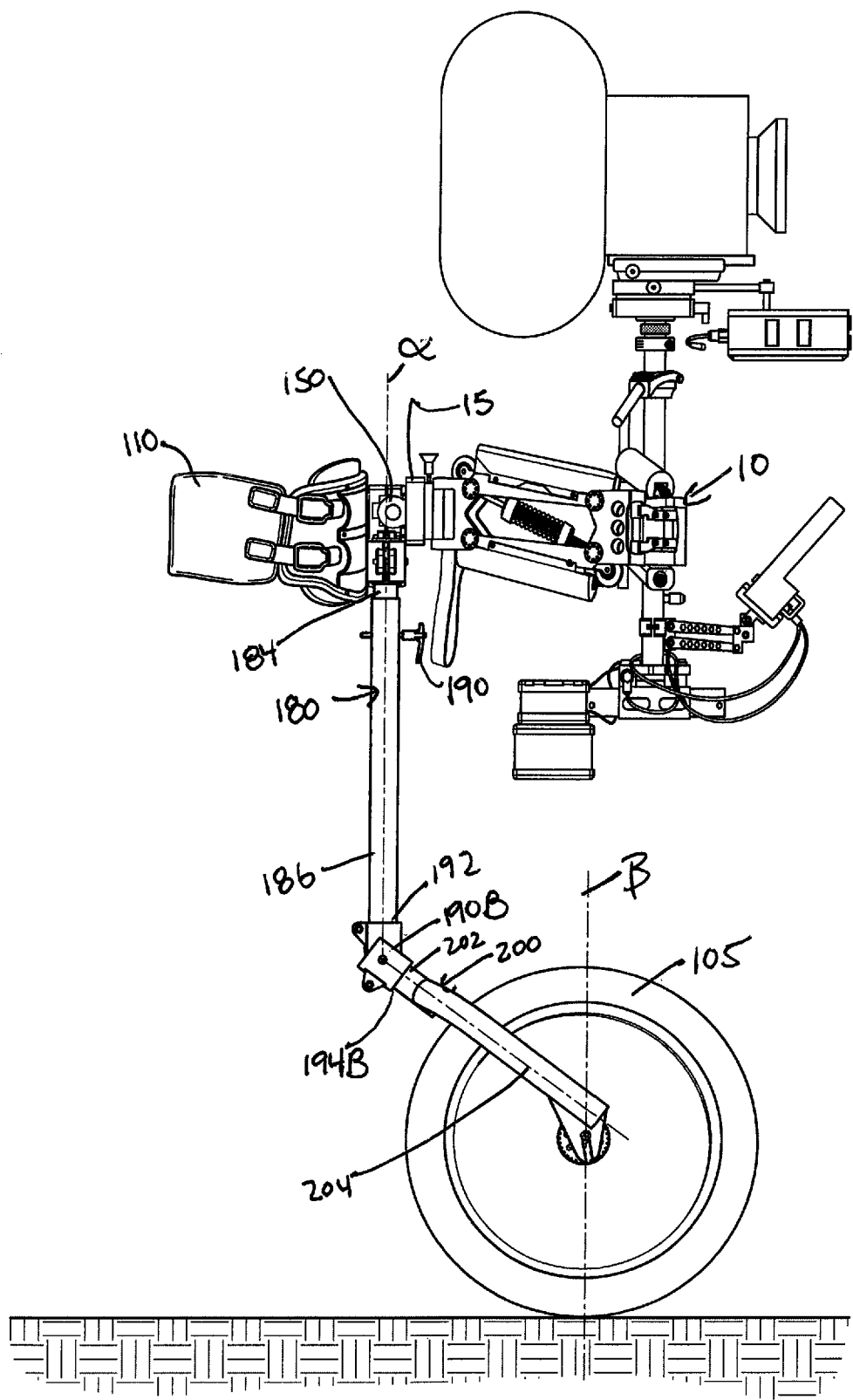
FIG. 7 is a side view of a third embodiment of a support system illustrating the wheel being positioned at an angle downwardly from a horizontally positioned leg support member.

In a third embodiment of the present invention, a third support system 100B shown in FIG. 7 includes a second set of L shaped bracket ends 190B having a pair of openings 192 and 194B angled greater than 90 degrees from each other, such that the fork 202 is angled down towards the surface. The displacement of the wheel 105, bringing the wheel 105 closer to the second brace support bars 180, or shortening the distance between a wheel axis and a second brace axis α, helps to reduce the force required by the operator to move the support system 100A because the resultant force vector acting on the wheel will be reduced.

Figure 8A:
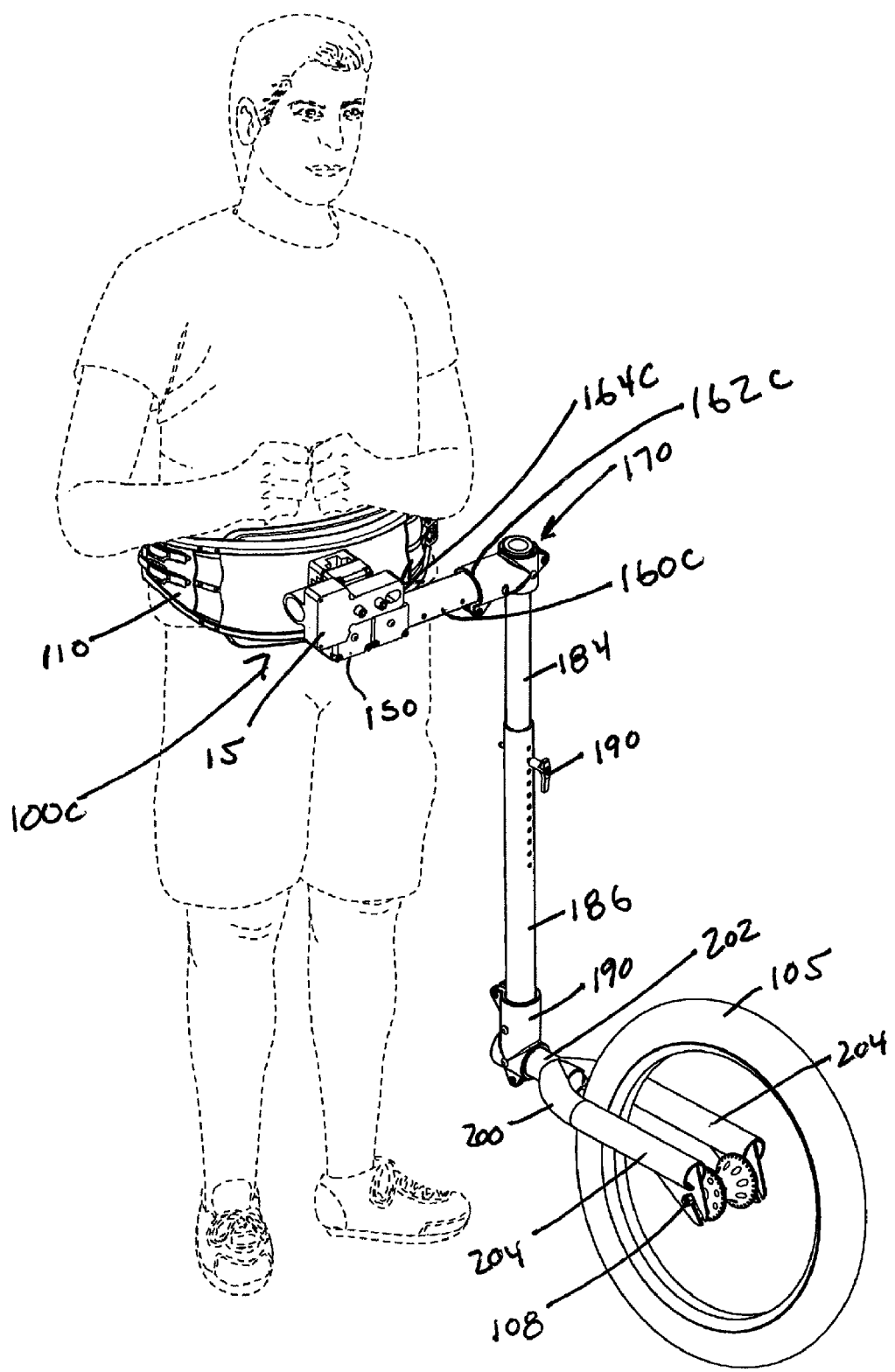
FIG. 8A is a front perspective view of a fourth embodiment of a support system illustrating a single wheel embodiment.
Figure 8B:
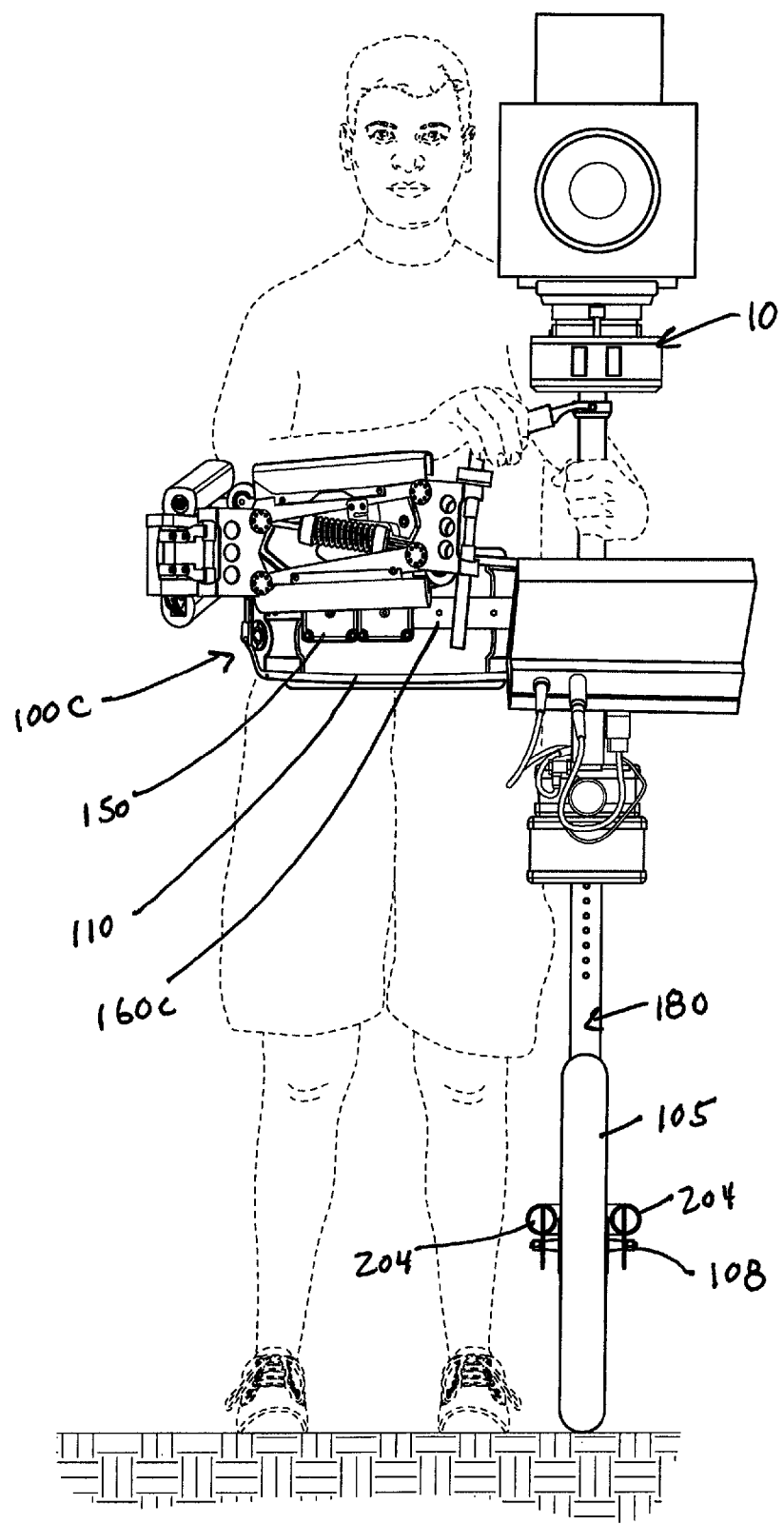
FIG. 8B is a front view of FIG. 8A.

Referring now to FIGS. 8A and 8B there is shown in a fourth embodiment of the present invention a fourth support system 100C. The fourth support system 100C includes a similar construction to the first support system in FIG. 3, however, the fourth support system 100C includes a single wheel 105 as opposed to a pair of wheels. The single wheel 105 is positioned or oriented along an end 162C of the first brace support bar 160C that also aligned with the end that includes the weight of the camera stabilizing device 10 and camera. The first brace support bar 160C may as shown be shortened in length such that the mounting bracket 150, which is still positioned about the centerline of the operator, is attached to an opposite end 164C of the first brace support bar 160C.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A support system for a user operating a camera attached to a camera stabilizing device, the camera stabilizing device including a socket block used for connecting to the camera stabilizing device, the support system comprising:
    a waist belt adapted to secure around a waist of the user operating the camera, the waist belt having a front portion;
    a mounting bracket being secured to the front section of the waist belt and having means for attaching to the socket block;
    a first brace support bar positioned substantially along a horizontal plane through a bore defined on the mounting bracket, the first brace support bar having opposed ends separately secured to a first pair of end brackets;
    a pair of second brace support bars separately extending substantially downwardly from the first pair of end brackets, the pair of second brace support bars each having a lower end secured to one of a second pair of end brackets opposed from the first pair of end brackets; and
    a pair of forks separately secured to the second pair of end brackets, each fork receiving a wheel such that a pair of wheels, defined by each wheel received by the pair of forks, rotate independently of each other without sharing a common axis.

2. The support system of claim 1, wherein the waist belt is an adjustable waist belt.

3. The support system of claim 2, wherein the waist belt further includes a padded section attached to an inside portion of the front section of the waist belt such that the padded section is positioned between the waist belt and the user operating a camera.

4. The support system of claim 1, wherein the means for securing the mounting bracket to the socket block includes the mounting bracket having at least one opening that aligns with a corresponding opening on the socket block, and at least one bolt secured through the aligned openings on the mounting bracket and socket block.

5. The support system of claim 1, wherein the first brace support bar is laterally adjustable in the bore of the mounting bracket by having a plurality of lateral openings on the first brace support bar that align with at least one opening on the mounting bracket, and at least one removable pin placed through the at least one opening on the mounting bracket and an aligned opening on the first brace support bar.

6. The support system of claim 1, wherein the second pair of end brackets each having a first opening positioned in a substantially upright position for receiving the lower end of one of pair of second brace support bars and having a second opening positioned at an angle defined as about 90° from the first opening for receiving an end of the fork.

7. The support system of claim 1, wherein the second pair of end brackets each having a first opening positioned in a substantially upright position for receiving the lower end of one of pair of second brace support bars and having a second opening positioned at an angle defined between 90° and 180° from the first opening for receiving an end of the fork.

8. The support system of claim 1, wherein each of the pair of second brace support bars includes an adjustable two piece support bar such that the pair of second brace support bars are independently and separately adjustable.

9. The support system of claim 1, wherein the pair of second brace support bars being spaced about 25-30 inches apart.

10. A support system for a user operating a camera attached to a camera stabilizing device, the camera stabilizing device including a socket block used for connecting to the camera stabilizing device, the support system comprising:
    a waist belt adapted to secure around a waist of the user operating the camera, the waist belt having a front portion;
    a mounting bracket being secured to the front section of the waist belt and having means for attaching to the socket block;
    a first brace support bar positioned substantially along a horizontal plane through a bore defined on the mounting bracket, the first brace support bar having opposed ends, one of the opposed ends being secured to a first end bracket, the other end of the opposed ends of the first brace support bar terminating at the mount bracket;
    a second brace support bar extending substantially downwardly from the first end bracket, the second brace support bar having a lower end secured to a second end bracket opposed from the first end bracket; and
    a fork secured to the second end bracket, the fork receiving a wheel.

11. The support system of claim 10, wherein the waist belt is an adjustable waist belt.

12. The support system of claim 11, wherein the waist belt further includes a padded section attached to an inside portion of the front section of the waist belt such that the padded section is positioned between the waist belt and the user operating a camera.

13. The support system of claim 10, wherein the means for securing the mounting bracket to the socket block includes the mounting bracket having at least one opening that aligns with a corresponding opening on the socket block, and at least one bolt secured through the aligned openings on the mounting bracket and socket block.

14. The support system of claim 10, wherein the first brace support bar is laterally adjustable in the bore of the mounting bracket by having a plurality of lateral openings on the first brace support bar that align with at least one opening on the mounting bracket, and at least one removable pin placed through the at least one opening on the mounting bracket and an aligned opening on the first brace support bar.

15. The support system of claim 10, wherein the second end bracket has a first opening positioned in a substantially upright position for receiving the lower end of the second brace support bar and having a second opening positioned at an angle defined as about 90° from the first opening for receiving an end of the fork.

16. The support system of claim 10, wherein the second end bracket has a first opening positioned in a substantially upright position for receiving the lower end of the second brace support bar and having a second opening positioned at an angle defined between 90° and 180° from the first opening for receiving an end of the fork.

17. The support system of claim 10, wherein the second brace support bar is an adjustable two piece support bar.

18. A support system for a user operating a camera attached to a camera stabilizing device, the support system comprising:
   a camera stabilizing device for attaching to a camera, the camera stabilizing device having a socket block connection;
   a waist belt adapted to secure around a waist of the user operating the camera, the waist belt having a front portion;
   a mounting bracket being secured to the front section of the waist belt and having a section for attaching to the socket block;
   a first brace support bar positioned substantially along a horizontal plane through a bore defined on the mounting bracket, the first brace support bar having ends separately secured to a first pair of end brackets;
   a pair of second brace support bars separately extending substantially downwardly from the first pair of end brackets, each of the pair of second brace support bars includes an adjustable two piece support bar such that the pair of second brace support bars are independently and separately adjustable, the pair of second brace support bars each having a lower end secured to one of a second pair of end brackets opposed from the first pair of end brackets; and
   a pair of forks separately secured to the second pair of end brackets, each fork receiving a wheel such that a pair of wheels, defined by each wheel received by the pair of forks, rotate independently of each other without sharing a common axis.

19. The support system of claim 18, wherein the second pair of end brackets each having a first opening positioned in a substantially upright position for receiving the lower end of one of pair of second brace support bars and having a second opening positioned at an angle defined between 90° and 180° from the first opening for receiving an end of the fork.

* * * * *